Figure 1:
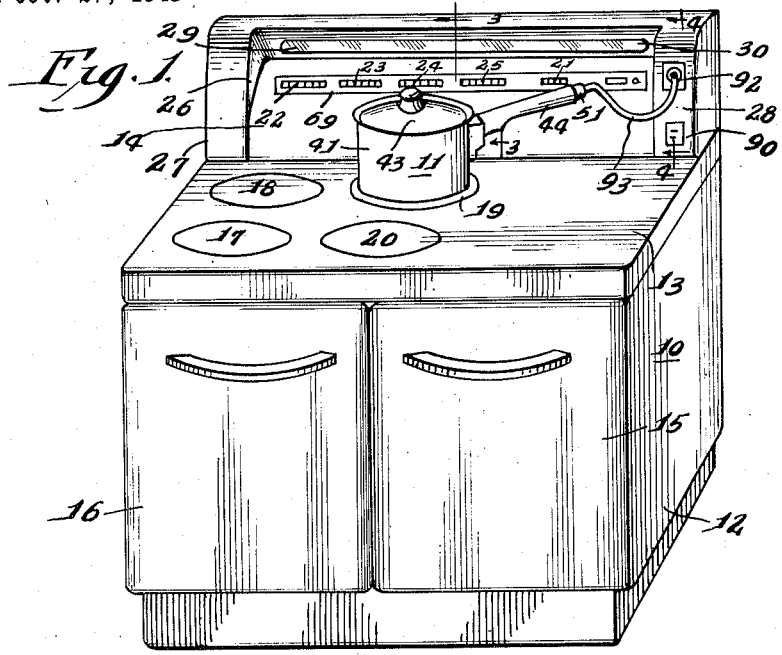

April 24, 1951  W. R. McDOWELL  2,550,579
HEATING CIRCUIT CONTROL FOR ELECTRIC RANGES
Filed Oct. 27, 1948  2 Sheets-Sheet 1

Inventor,
Walter R. McDowell.
By Smith, Olsen & Baird
Attorneys.

April 24, 1951 W. R. McDOWELL 2,550,579
HEATING CIRCUIT CONTROL FOR ELECTRIC RANGES
Filed Oct. 27, 1948 2 Sheets-Sheet 2

Inventor.
Walter R. McDowell.
By Smith, Olsen & Baird
Attorneys

Patented Apr. 24, 1951

2,550,579

UNITED STATES PATENT OFFICE 2,550,579

HEATING CIRCUIT CONTROL FOR ELECTRIC RANGES

Walter R. McDowell, Westchester, Ill., assignor to Hotpoint Inc., a corporation of New York Application October 27, 1948, Serial No. 56,813

6 Claims. (Cl. 219—20)

The present invention relates to heating circuit controls for electric ranges, and more particularly to improved controls of the type disclosed in the copending application of Leo F. Berg and Walter R. McDowell, Serial No. 17,248, filed March 26, 1948, now Patent No. 2,530,643.

In the Berg and McDowell application mentioned there is disclosed an electric range provided with a cooking top carrying a surface heating unit and a backsplasher carrying a manually operable control switch of the rotary multiple-position type for selectively setting the heating control connections of the heating unit with respect to an associated source of current supply. Also this electric range comprises a cooking vessel carrying a thermal responsive device operative in response to a predetermined cooking condition in the vessel, a relay operative to change the heating control connections of the heating unit with respect to the source, and a control circuit including the device for operating the relay.

In the operation of this electric range the control switch is first set to its high control position and the vessel and its contents are placed upon the surface heating unit, whereby the vessel and its contents are heated at the high rate. When a cooking temperature is reached by the contents of the vessel, the thermal responsive device is operated automatically to govern the control circuit so as to effect operation of the relay. Upon operating the relay controls its own contacts in order to interrupt the high rate heating connection to the surface heating unit and then to complete a low rate heating connection to the surface heating unit, thereby to prevent vigorous boiling of the contents of the vessel.

While this heating control circuit arrangement is entirely satisfactory in operation, it renders an indicator associated with the control switch ineffective to indicate the actual heating rate of the surface heating unit, when the relay occupies its operated position. In other words, the operation of the relay to change the heating connections from the high rate to the low rate does not change the position of the control switch, so that the associated indicator erroneously indicates the high heating rate after the low heating rate is effected. This peculiar operation of this heating control circuit arrangement is confusing to the user of the electric range as she relies upon the indicator and erroneously contends that the arrangement is working improperly.

Accordingly, it is a general object of the present invention to provide in an electric range, a heating control circuit arrangement comprising a single control switch that is selectively set both manually and automatically for the purpose of selectively controlling the associated heating unit so that the indicator associated with the control switch always indicates the actual heating control connection of the heating unit with respect to the associated source of current supply.

Another object of the invention is to provide in an electric range, an improved heating control arrangement utilizing a manually operable push button switch and a motor for operating a given one of the push buttons in order to obtain an automatic control of the associated heating unit.

Another object of the invention is to provide in the combination of an electric range and a cooking vessel, an improved automatic arrangement controlled in accordance with the cooking condition in the vessel for governing the heating rate of the heating unit arranged in heat exchange relation with the vessel.

A further object of the invention is to provide in the combination noted, an improved quick-detachable control circuit arrangement between the electric range and the cooking vessel.

Further features of the invention pertain to the particular arrangement of the elements of the electric range and of the control circuit, whereby the above-outlined and additional operating features thereof are attained.

Figure 2:
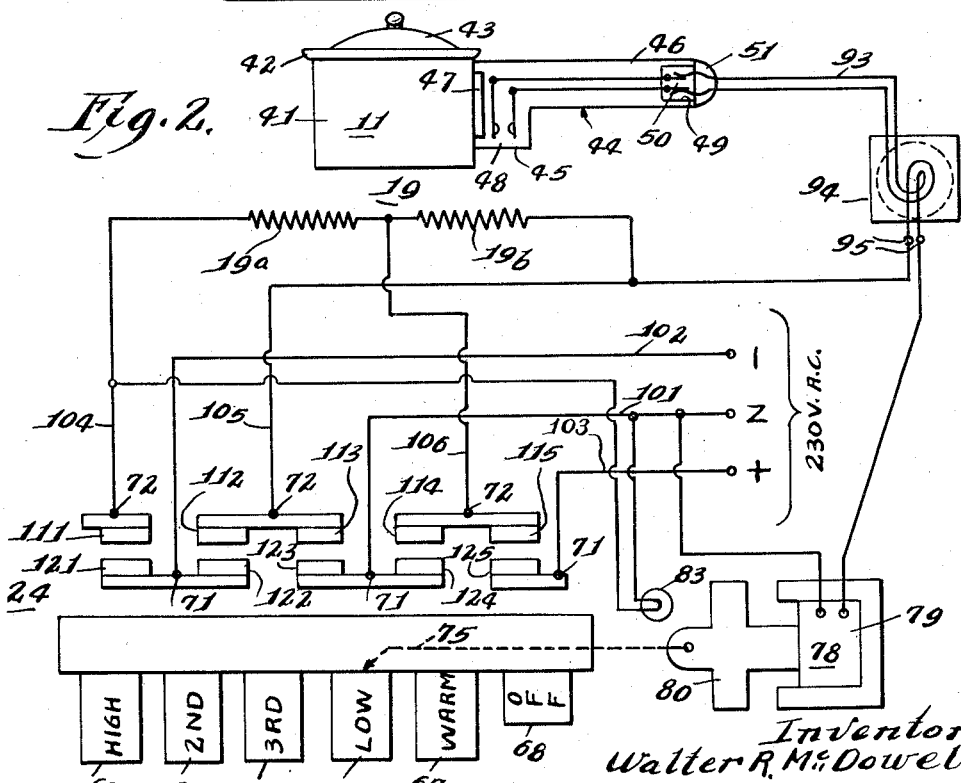
Figure 3:
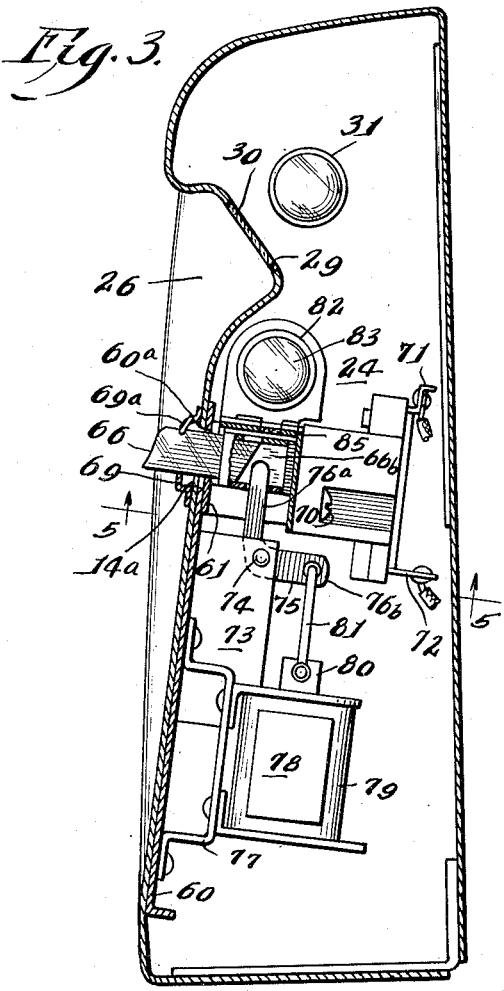
Figure 4:
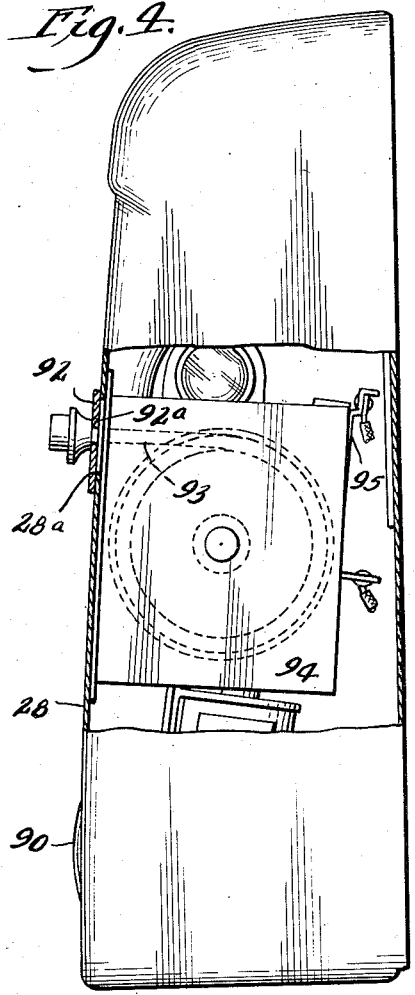
Figure 5:
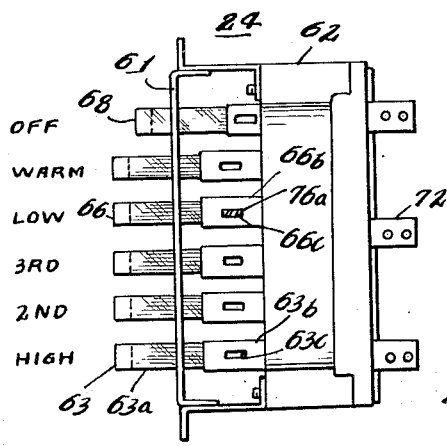

The invention, both as to its organization and method of operation, together with further objects and advantages thereof, will best be understood by reference to the following specification taken in connection with the accompanying drawings, in which Figure 1 is a front perspective view of an electric range and a cooking vessel supported by one of the heating units carried by the associated cooking top and embodying the present invention; Fig. 2 is a diagrammatic illustration of the heating and control circuits and facilities incorporated in the electric range and in the cooking vessel; Fig. 3 is a greatly enlarged sectional view, taken through the backsplasher of the electric range in the direction of the arrows along the line 3—3 in Fig. 1, illustrating the push button control switch and the electroresponsive operating motor therefor; Fig. 4 is a greatly enlarged end view, similar to Fig. 3, partly broken away, taken in the direction of the arrows along the line 4—4 in Fig. 1, illustrating the quick-detachable electric cable connector mechanism that is provided for connecting the cooking vessel into the control circuit when automatic heating control of the associated heating unit is desired;

and Fig. 5 is a greatly enlarged bottom view of the push button control switch, taken in the direction of the arrows along the line 5—5 in Fig. 3.

Referring now to Fig. 1 of the drawings, there is illustrated the combination of an electric range 10 and a cooking vessel 11 embodying the features of the present invention. More particularly, the range 10 comprises an upstanding frame or body 12 provided with a substantially horizontally disposed cooking top 13 terminating adjacent to the rear thereof in an upwardly extending backsplasher 14. The body 12 comprises an oven disposed in the right hand portion thereof below the cooking top 13 and having an open front closed by a suitable door 15, the door 15 being hinged adjacent to the lower edge thereof in a manner not shown. Also the body 12 comprises a storage space disposed in the left hand portion thereof below the cooking top 13 and receiving movable drawer structure 16. The left hand upper surface of the cooking top 13 carries four surface heating units 17, 18, 19 and 20. The oven is provided with a heating circuit including a push button control switch 21; and the heating units 17, 18, 19 and 20 are respectively provided with heating circuits respectively including push button control switches 22, 23, 24 and 25, the push button control switches 21 to 25, inclusive, being mounted upon the backsplasher 14. The heating units 17, 18, 19 and 20 are arranged in a substantially rectangular pattern upon the upper surface of the cooking top 13 and are hereinafter respectively referred to as the left front, the left rear, the right rear and the right front surface heating units. More particularly, the backsplasher 14 has a centrally disposed depression 26 formed therein and disposed between the left hand end 27 and the right hand end 28 thereof. An elongated window 29 is arranged in the upper portion of the depression 26 into which a suitable pane of transparent material 30, such as glass, or the like, is mounted, an elongated electric lamp 31 being disposed behind the pane 30 for the purpose of illuminating the front of the backsplasher 14, and consequently the cooking top 13, as illustrated in Fig. 3. As previously indicated the backsplasher 14 is of hollow construction and the switches 22, 23, 24, 25 and 21 are preferably arranged in a straight line in the depression 26 below the pane 30 as clearly shown in Figs. 1 and 3.

As diagrammatically illustrated, the cooking vessel 11 is preferably of the construction and arrangement disclosed in the previously mentioned Berg and McDowell application, the vessel 11 being formed of aluminum, or the like, and comprising a substantially cylindrical side wall 41 provided with an open top and a connecting bottom wall. The open top of the side wall 41 is provided with an outwardly flared rim 42 that is adapted internally to receive the outwardly flared rim of a cooperating removable cover 43, also formed of aluminum, or the like. The vessel 11 comprises a hollow handle 44 the inner end of which terminates in a hollow housing 45 that is detachably secured to the cylindrical side wall 41 and the outer end of which terminates in a hand-gripping portion 46 formed of any suitable thermal and electrical insulating material. Within the housing 45 there is mounted a thermal responsive device 47 disposed in good heat exchange relation with the cylindrical side wall 41 of the vessel 11 when the housing 45 is secured thereto. Also a control switch 48 is arranged within the housing 45 and operatively connected to the thermal responsive device 47. In the extreme outer end of the hand-gripping portion 46 of the handle 44 a cavity 49 is provided, in which there is supported a plug 50, the plug 50 being electrically wired through the handle 44 to the control switch 48. In the arrangement the plug 50 is disposed entirely within the cavity 49 and the plug 50 is connected in water-tight relation with the handle 44 in order to prevent the admission of water into the hollow structure of the handle 44. Also the cavity 49 is adapted to receive a socket 51 forming a part of the control circuit, described more fully hereinafter, which socket 51 when supported in the cavity 49 makes good electrical contact with the plug 50 for the purpose of connecting the control switch 48 into the control circuit. When it is necessary to wash the vessel 11 the handle 44 may be detached therefrom, or the whole assembly may be washed as a unit; all as disclosed in the previously mentioned Berg and McDowell application.

Preferably each of the control switches 21, 22, 23, 24 and 25 is of the manually operable push button type disclosed in U. S. Patent No. 2,431,904, granted on December 2, 1947, to John L. Andrews. For example, the control switch 24 individual to the right rear surface heating unit 19 comprises, as shown in Figs. 3 and 5, and as diagrammatically illustrated in Fig. 2, an upstanding base 60 supporting adjacent to the upper end thereof a laterally extending bracket 61 carrying a rearwardly disposed insulating housing 62 of hollow construction. The push button switch 24 comprises six individual control positions and six individual push buttons respectively corresponding to the six individual control positions. Specifically, the push button switch 24 comprises the control positions high, second, third, low, warm and off; and the corresponding push buttons 63, 64, 65, 66, 67 and 68. The outer ends of the push buttons 63, etc., comprise solid blocks 63a, etc., formed of transparent plastic material such for example as cellulose acetate, or the like; while the inner ends of the push buttons 63, etc., comprise hollow substantially rectangular jackets 63b, etc., rigidly secured to the blocks 63a, etc., of the push buttons 63, etc. The blocks 63a, etc., project forwardly through guide openings formed in the bracket 61, while the jackets 63b, etc., project rearwardly through guide openings formed in the housing 62. As illustrated in Fig. 3, the push buttons 63, etc., project through a laterally extending slot 60a formed in the base 60, thence through a laterally extending registering slot 14a formed in the front of the backsplasher 14 and ultimately through a laterally extending slot 69a formed in a laterally extending trim member 69 secured to the front of the backsplasher 14 within the depression 26. Accordingly, in the push button switch 24 the individual push buttons 63, etc., are readily accessible from the front of the backsplasher 14 and may be readily operated manually; while the trim member 69 trims the front of the backsplasher 14 concealing the openings 14a, etc., formed therein through which the push buttons of the individual switches 24, etc., project.

The insulating housing 62 is removably secured to the bracket structure 61 by a pair of screws 70, and the rear end thereof supports three laterally spaced-apart upper line terminals 71 and three laterally spaced-apart lower control terminals 72, the terminals 71 and 72 being utilized for the purpose of establishing connections through the switch 24 between a source of current supply and the surface heating unit 19, as explained more fully hereinafter. The housing 62 supports both stationary and movable contact structure, as well as control mechanism selectively operated by the individual push buttons 63, etc., for the purpose of operating the contact structure into the various circuit control positions, and interlock mechanism for the purpose of preventing simultaneous operation of two of the push buttons 63, etc.; all as disclosed in the Andrews patent mentioned. For example, when the off push button 68 occupies its inwardly disposed operated position the heating connections to the right rear surface heating unit 19 are interrupted and the remainder of the push buttons 63, etc., occupy their outwardly disposed unoperated positions. At this time when the high push button 63 is moved to its inwardly disposed operated position, the off push button 68 is first moved to its outwardly disposed unoperated position by the interlock mechanism and simultaneously the control mechanism actuates the movable contact structure with respect to the stationary contact structure in order to establish the high heating control circuit between the right rear surface heating unit 19 and the source of current supply, as described more fully hereinafter.

Each of the jackets 63b, etc., of the push buttons 63, etc., has an opening 63c formed in the lower surface thereof that is adapted to receive an arm of a bell-crank for the purpose of effecting motor operation of the corresponding push button 63, etc. In the present example the bell-crank arrangement is operatively associated with the low push button 66, and specifically the base 60 carries a rearwardly extending tab 73 that is disposed adjacent to and below the low push button 66, the tab 73 carrying a pivot pin 74 upon which the bell-crank 75 is pivotally mounted. More specifically, the bell-crank 75 comprises an upwardly directed arm 76a that projects through the opening 66c in the jacket 66b of the low push button 66 and a rearwardly extending arm 76b. Also the base 60 carries adjacent to the lower end thereof a rearwardly extending substantially U-shaped bracket 77 upon which there is mounted an electro-responsive motor 78. More particularly, the motor 78 comprises a solenoid or winding 79 and field structure provided with an associated armature 80 that is operatively connected by a link 81 to the outer end of the arm 76b of the bell-crank 75. Thus it will be understood that the low push button 66 may be operated either manually from the front of the backsplasher 14 or automatically by the motor 78. More specifically, when the winding 79 of the motor 78 is energized the armature 80 is drawn downwardly rotating the bell-crank 75 in the clockwise direction, as viewed in Fig. 3, about the pivot pin 74 and moving the low push button 66 from its unoperated position into its operated position. Of course, it will be understood that when the low push button 66 is operated either manually from the front of the backsplasher 14 or automatically by the motor 78 the push button switch 24 is operated into its low heating control position.

Further the push button switch 24 comprises a metallic hood 82 disposed above the jackets 63b, etc., and carrying an electric lamp 83 adapted to project illumination downwardly onto the blocks 63a, etc. Preferably each of the control switches 24, etc., embodies the color indicator arrangement for indicating the operated position thereof disclosed in U. S. Patent No. 2,437,555, granted on March 9, 1948, to Gregory L. Rees. Specifically, a transparent color card 85 is arranged below the lamp 83 and above the jackets 63b, etc.; which color card 85 carries a series of individually colored transparencies respectively associated with the blocks 63a, etc., and respectively indicating by color the control position of the push button switch 24; all as disclosed in the Rees patent mentioned. More particularly, the colored transparencies carried by the color card 85 and respectively associated with the push buttons 63, 64, 65, 66 and 67 are red, yellow, purple, green and blue and are respectively brought into operative relation with respect to the blocks 63a, etc., when the respective push buttons 63, etc., are operated. Thus when the high push button 63 is operated the lamp 83 is illuminated and the block 63a is moved into operative relation with the red transparency carried by the color card 85 so that the extreme outer end of the high push button 63 glows red indicating that the push button switch 24 occupies its high control position. The second push button 64 glows yellow when it is operated, and the other push buttons 65, 66 and 67 respectively glow in the corresponding colors purple, green and blue, when they are individually operated. Thus a color indicator is incorporated in the push button switch 24 in addition to the physical positions of the push buttons 63, etc., for the purpose of indicating the different control positions thereof.

The right hand end 28 of the backsplasher 14 carries a lower electrical receptacle 90, illustrated in Figs. 1 and 4, that may be utilized for the purpose of receiving the plug of a small electrical appliance, such, for example, as an electric coffee pot; while an opening 28a is formed in the right hand end 28 of the backsplasher 14 above the receptacle 90 and covered by an associated ornamental trim element 92. The trim element 92 has a centrally disposed opening 92a formed therein through which a flexible connector or cable 93 extends, the outer end of the cable 93 carrying the socket 51. A reel mechanism 94 is mounted behind the right hand end 28 of the backsplasher 14 and receives the inner end of the cable 93. The reel mechanism 94 may be of any conventional type, such, for example, as of the window-shade construction, capable of paying-out a fixed predetermined length of cable 93 and of retracting the payed-out length of cable 93 when the socket 51 is released. More particularly, the reel mechanism 94 normally biases the cable 93 into its retracted position causing the socket 51 to be drawn into contact with the front of the trim element 92, the socket 51 being sufficiently large to prevent passage thereof through the opening 92a formed in the trim element 92. At this time the socket 51 engages the front of the trim element 92 and is completely out of the way with respect to the cooking top 13. When it is desired to use the cooking vessel 11 the socket 51 is seized and pulled forwardly; whereby the reel mechanism 94 pays-out the required amount of the flexible cable 93 so that the socket 51 may be readily placed into the recess 49 provided in the end of the handgripping portion 46 of the handle 44 for the purpose of establishing electrical connection between the socket 51 and the plug 50. As the cable 93 is payed-out a stop arrangement, not shown, incorporated in the reel mechanism 94 restrains the cable 93 in its payed-out position; however, when the socket 51 is detached from the plug 50 and released the stop arrangement is released and the cable 93 is again retracted bringing the socket 51 into engagement with the trim element 92. The reel mechanism 94 is arranged to pay-out only a limited length of the cable 93; whereby the socket 51 may be readily attached to the plug 50 and the vessel 11 moved by the hand-gripping portion 46 of the handle 44 into heat exchange relation with respect to the right rear surface heating unit 19. However, this length of the cable 93 is not sufficient to permit the cooking vessel 11 to be placed in heat exchange relation with any one of the other surface heating units 17, 18 and 20. Thus it will be understood that when the socket 51 is attached to the plug 50 the cooking vessel 11 must be used only upon the right rear surface heating unit 19, as the length of cable 93 will not reach any one of the other surface heating units. Finally, the reel mechanism 94 comprises terminals 95 that are employed for the purpose of connecting the inner end of the cable 93 into the associated control circuit.

Considering now the heating and control circuit arrangement in greater detail, the range 10 comprises as shown in Fig. 2, a source of current supply of the three-wire Edison type, which may be 230 volts A. C., including a neutral conductor 101 and two other conductors 102 and 103, hereinafter referred to as "outside" conductors. As previously mentioned the heating circuit of the right rear surface heating unit 19 comprises the push button control switch 24 of the construction and arrangement previously described, the three line terminals 71 thereof being respectively connected to the three conductors 101, 102 and 103 of the source mentioned, and the three control terminals 72 thereof being respectively connected to the conductors 104, 105 and 106 extending and connected to the heating unit 19. Specifically, the stationary contact structure incorporated in the switch 24 comprises the five stationary contacts 111, 112, 113, 114 and 115; while the movable contact structure incorporated in the switch 24 comprises the five movable contacts 121, 122, 123, 124 and 125. The stationary contact 111 is connected via the conductor 104 to the left hand extremity of the heating unit 19; the stationary contacts 112 and 113 are connected together and via the conductor 105 to the right hand extremity of the heating unit 19; while the stationary contacts 114 and 115 are connected together and via the conductor 106 to the mid-tap of the heating unit 19; the heating unit 19 being of the two-section type including the respective left hand and right hand sections 19a and 19b. The movable contacts 21 and 22 are connected together and to the outside conductor 102; the movable contacts 123 and 124 are connected together and to the neutral conductor 101; and the movable contact 125 is connected to the outside conductor 103. Also the conductor 105 is connected to one terminal 95 of the reel mechanism 94; and the other terminal 95 of the reel mechanism 94 is connected to one terminal of the winding 79 of the motor 78; while the other terminal of the winding 79 is connected to the neutral conductor 101.

Before proceeding with the description of the operation of the heating control circuit in conjunction with the cooking vessel 11 it is noted that when the off push button 68 of the push button switch 24 is operated, as illustrated in Fig. 2, the movable contacts 121 to 125, inclusive, are operated respectively to disengage the individually associated stationary contacts 111 to 115, inclusive; whereby the circuit connections between the source mentioned and the heating unit 19 are open.

When the high push button 63 is moved to its operated position, the off push button 68 is returned to its unoperated position and the movable contacts 121, 122 and 125 are operated into respective engagements with the stationary contacts 111, 112 and 115; whereby the extremities of the heating sections 19a and 19b are connected to the outside conductor 102 and the mid-tap between the heating sections 19a and 19b is connected to the outside conductor 103. Thus the two heating sections 19a and 19b are connected in parallel across the 230 volts source; which position comprises the high heat position of the push button switch 24.

When the second push button 64 is moved to its operated position, the high push button 63 is returned to its unoperated position and the movable contacts 121 and 125 are operated into respective engagements with the stationary contacts 111 and 115; whereby the heating section 19a is connected across the outside conductors 102 and 103. Thus the heating section 19a is connected across the 230 volts source; which position comprises the second heat position of the push button switch 24.

When the third push button 65 is moved to its operated position, the second push button 64 is returned to its unoperated position and the movable contacts 121, 122 and 124 are operated into respective engagements with the stationary contacts 111, 112 and 114; whereby the extremities of the heating sections 19a and 19b are connected to the outside conductor 102 and the mid-tap between the heating sections 19a and 19b is connected to the neutral conductor 101. Thus the two heating sections 19a and 19b are connected in parallel across the 110 volts source; which position comprises the third heat position of the push button switch 24.

When the low push button 66 is moved to its operated position, the third push button 65 is returned to its unoperated position and the movable contacts 121 and 124 are operated into respective engagements with the stationary contacts 111 and 114; whereby the heating section 19a is connected across the outside conductor 102 and the neutral conductor 101. Thus the heating section 19a is connected across the 110 volts source; which position comprises the low heat position of the push button switch 24. In passing it is noted that the manual operation of the low push button 66 is not in any way interfered with by the bell-crank 75 connecting the low push button 66 to the motor 78.

When the warm push button 67 is moved into its operated position, the low push button 66 is returned to its unoperated position and the movable contacts 121 and 123 are operated into respective engagements with the stationary contacts 111 and 113; whereby the extremities of the heating sections 19a and 19b are connected to the outside conductor 102 and the neutral conductor 101. Thus the two heating sections 19a and 19b are connected in series across the 110 volts source; which position comprises the warm heat position of the push button switch 24.

When the off push button 68 is then moved to its operated position, the warm push button 67 is returned to its unoperated position and all of the movable contacts 121 to 125, inclusive, are operated to disengage the respective stationary contacts 111 to 115, inclusive, thereby again to interrupt the circuit connections between the heating unit 19 and the source.

In the foregoing description of the circuit control positions of the push button switch 24 it should be appreciated that the individual push buttons 63 to 68, inclusive, may be manually operated in any desired order or sequence in order to obtain the corresponding settings of the push button switch 24; and that the mechanical interlock mechanism arranged in the insulating housing 62 positively prevents simultaneous operation of any two of the push buttons. Moreover, the control mechanism arranged in the insulating housing 62 positively insures that all of the movable contacts 121 to 125, inclusive, are disengaged with respect to the associated stationary contacts 111 to 115, inclusive, between the operations of any two of the push buttons switch 24; whereby there is no danger of short-circuits within the insulating housing 62 incident to operation of the push button switch 24 from one of its control positions to the other. Also in passing it is noted that when the push button switch 24 occupies high, second, third, low or warm positions the electric lamp 83 is illuminated causing the corresponding operated push buttons 63, 64, 65, 66 or 67 to glow in the individual color in order to produce a color indication of the particular operated position of the push button switch 24. This may be accomplished by connecting the electric lamp 83 between the neutral conductor 101 and the conductor 104, since the movable contact 121 disengages the stationary contact 111 only when the off push button 68 occupies its operated position, as illustrated in Fig. 2. Thus the lamp 83 is illuminated when the off push button occupies its unoperated position, as explained above.

Considering now the operation of the range 10 in conjunction with the cooking vessel 11, the cook places the food to be cooked into the vessel 11 and then places the vessel 11 upon the right rear surface heating unit 19. Then the socket 51 is withdrawn from its position in engagement with the trim element 92 and inserted into the recess 49 formed in the outer end of the hand-gripping portion 46 of the handle 44 in order to establish electrical connection between the plug 50 and the socket 51 and consequently between the control switch 48 and the terminals 95 via the flexible cable 93. At this time the cover 43 is placed upon the vessel 11 and the high push button 63 of the push button switch 24 is moved to its operated position. Also at this time the thermostatic switch 48 occupies its open position since the associated thermostatic device 47 is cold; whereby the winding 79 of the motor 78 is de-energized. Since the high push button 63 occupies its operated position the sections 19a and 19b of the heating unit 19 are connected in parallel across the 230 volts source causing the heating unit 19 to develop heat at a high rate.

The vessel 11 and the contained food to be cooked is accordingly heated at a high rate by the heating unit 19; whereby the temperature of the thermostatic device 47 rises from the ambient temperature; and when the food contained in the vessel 11 reaches a temperature of approximately 210° F., the thermostatic device 47 operates the thermostatic switch 48 from its open position into its closed position. At this time the food contained in the vessel 11 has just begun to boil and will continue vigorous boiling shortly unless the rate of heating of the heating unit 19 is reduced; whereby the food contained in the vessel 11 may boil over and spill upon the heating unit 19 and the associated cooking top 13. However, this accident is prevented in the present arrangement by virtue of the fact that the thermostatic switch 48 is operated from its open position into its closed position at this time completing a circuit extending between the neutral conductor 101 and the outside conductor 102 for energizing the winding 79 of the motor 78; whereby the motor 78 is operated. The circuit mentioned extends from the neutral conductor 101 via the winding 79 to one of the terminals 95 and from the outside conductor 102 via the contacts 122 and 112 and the conductor 105 to the other terminal 95; the terminals 95 being connected together at the thermostatic switch 48 via the flexible cable 93, the socket 51, the plug 50 and the connections disposed in the handle 44.

When the winding 79 of the motor 78 is thus energized the armature 80 is attracted, causing the bell-crank 75 to be operated through the link 81 so that the low push button 66 is moved into its operated position; whereby the high push button 63 is returned to its unoperated position. When the low push button 66 is thus moved to its operated position and the high push button 63 is returned to its unoperated position, the movable contacts 121, 122 and 125 are first operated to disengage the stationary contacts 111, 112 and 115, and the movable contacts 121 and 124 are then operated to engage the stationary contacts 111 and 114; whereby the circuit for energizing the winding 79 of the motor 78 is interrupted incident to disengagement of the movable contact 122 and the stationary contact 112 in order to prevent unnecessary heating of the winding 79 at this time. In passing it is noted that while the movable contact 122 disengages the stationary contact 112 before the low push button 66 is moved completely into its operated position, the low push button 66 is, nevertheless, moved completely into its operated position due to the kinetic energy of the moving armature 80 of the motor 78 at this time. Accordingly, at this time the low push button 66 of the push button switch 24 occupies its operated position causing the completion of the circuit for supplying low heat to the heat unit 19; whereby the vessel 11 and the contained food are heated by the heating unit 19 at the low heating rate in order to prevent undue boiling of the contained food. This arrangement is very advantageous in view of the fact that it not only conserves electric energy but it also prevents undue vigorous boiling of the food contained in the vessel 11 and the likelihood of the contained food boiling over upon the heating unit 19 and the associated cooking top 13.

In the operation of the push button switch 24, the high push button 63 glows red when it occupies its operated position, while the low push button 66 glows green when it occupies its operated position; whereby the distinctive color indications supplement the physical positions of the respective push buttons 63 and 66 in order to produce appropriate indications to the cook of the respective actual control positions of the push button switch 24. Thus it will be understood that when the motor 78 is operated by the thermostatic switch 48 carried by the vessel 11 that the positions of the respective high and low push buttons 63 and 66 are physically interchanged, and the appropriate two color indicators are interchanged so that there can never be any doubt in the mind of the cook concerning operation of the motor 78 and the consequent reduction of the heating rate of the heating unit 19 associated with the vessel 11 from high heat to low heat. Also upon operating the motor 78 in operating the push button switch 24 produces a clicking noise that is highly advantageous as this clicking of the push button switch 24 produces an audible signal indicating to the cook that the heating rate of the heating unit 19 associated with the vessel 11 has been changed from high to low.

In the normal operation of the electric range 10 the thermostatic switch 43 reduces the heating rate of the heating unit 19 after the contents of the vessel 11 is heated to the predetermined cooking condition mentioned and thereafter cooking of the contents of the vessel 11 proceeds at the low rate for the required time interval depending upon the character of the food undergoing the cooking process. After the food contained in the vessel 11 has been appropriately cooked, the cook moves the off push button 68 into its operated position; whereby the push button switch 24 interrupts the heating connections between the heating unit 19 and the source. At this time the cook removes the detachable socket 51 from the cavity 49 provided in the hand-gripping portion 46 of the handle 44 and pulls thereupon in order to cause the reel mechanism 94 to retract the flexible cable 93 again moving the socket 51 into engagement with the outer surface of the trim element 92 and out of the way with respect to the cooking top 13. The vessel 11 may then be removed from the heating unit 19 utilizing the hand-gripping portion 46 of the handle 44. Thereafter the contents of the vessel 11 may be removed to a suitable dish and the vessel 11, as a whole, may be washed as there is no danger of water entering the internal structure of the handle 44.

In passing it is noted that since the cable 93 terminates in the socket 51 there is no danger of short-circuits or false control of the motor 78 should the socket 51 become disengaged from the plug 50. Also in utilizing the electric range 10 in conjunction with the vessel 11 there is no possibility of damaging the cable 93 by heating it since the cable 93 is too short to extend over any one of the surface heating units 19, etc., the cable 93 being only long enough to reach between the right hand end 28 of the backsplasher 14 and the handle 44, when the vessel 11 is supported upon the right rear surface heating unit 19.

In view of the foregoing it is apparent that there has been provided an improved combination of an electric range and a cooking vessel, the vessel being selectively operative to control heating thereof by the associated surface heating unit of the electric range. Moreover this arrangement utilizes an improved and simplified control circuit employing a single push button switch that is jointly controlled manually and by the associated electro-responsive motor; whereby the heating rate of the surface heating unit is controlled entirely by the push button switch and the push button switch is provided with an indicator arranged to indicate the actual operated position thereof at all times. Finally, the electric range comprises an improved arrangement for facilitating connection of the control circuit into the thermostatic switch carried by the cooking vessel.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an electric range including a body supporting a heating unit, a source of current supply, and a manually operable unitary control switch selectively operative into a plurality of different positions in order to establish a corresponding plurality of different electrical heating connections between said heating unit and said source in order to effect heating of said heating unit at corresponding different heating rates; the combination comprising an electro-responsive motor operative to operate said switch into a given one of its positions, an operating circuit for said motor, means responsive to operation of said switch into a predetermined one of its positions for preparing said operating circuit, means including a device governed by said heating unit for closing said prepared operating circuit, and means responsive to operation of said switch into said given position for opening said operating circuit.

2. In an electric range including a body supporting a heating unit, a source of current supply, and a manually operable push button control switch including a plurality of push buttons selectively operative to establish a corresponding plurality of different electrical heating connections between said heating unit and said source in order to effect heating of said heating unit at corresponding different heating rates; the combination comprising an electro-responsive motor operative to operate a given one of said push buttons, an operating circuit for said motor, means responsive to operation of a predetermined one of said push buttons for preparing said operating circuit, means including a device governed by said heating unit for closing said prepared operating circuit, and means responsive to operation of said given push button for opening said operating circuit.

3. In an electric range including a body supporting a heating unit, a source of current supply, and a manually operable unitary control switch selectively operative from an off position into respective high and low positions to complete respective high and low electrical heating connections between said source and said heating unit in order to effect heating of said heating unit at corresponding high and low heating rates, said switch being manually operated from said off position into said high position to initiate heating of said heating unit; the combination comprising a cooking vessel supported in heat exchange relation with said heating unit, a device carried by said vessel and operative in response to a predetermined cooking condition therein, a detachable circuit connector extending between said body and said vessel permitting ready removal of said vessel from said heating unit, an electro-responsive motor for operating said switch from said high position into said low position, an operating circuit for said motor including said connector, means responsive to operation of said switch into said high position for preparing said operating circuit, means responsive to operation of said device for closing said prepared operating circuit, and means responsive to operation of said switch into said low position for opening said operating circuit.

4. In an electric range including a body supporting a heating unit, a source of current supply, a manually operable push button control switch including off and high and low push buttons, and means responsive to operation of said off push button for disconnecting said heating unit from said source and responsive to operation of said respective high and low push buttons for completing respective high and low electrical heating connections between said source and said heating unit in order to effect heating of said heating unit at corresponding high and low heating rates, said high push button being manually operated to initiate heating of said heating unit; the combination comprising a cooking vessel supported in heat exchange relation with said heating unit, a device operatively associated with said cooking vessel and operative in response to a predetermined cooking condition therein, an electro-responsive motor for operating said low push button, an operating circuit for said motor, means responsive to operation of said high push button for preparing said operating circuit, means responsive to operation of said device for closing said prepared operating circuit, and means responsive to operation of said low push button for opening said operating circuit.

5. In an electric range including a cooking top, a backsplasher, a heating unit carried by said cooking top, a source of current supply, a manually operable unitary control switch mounted in an opening provided in said backsplasher and selectively operative from the front of said backsplasher into off and high and low positions, and means responsive to operation of said switch from its off position into its respective high and low positions for completing respective high and low heating connections between said source and said heating unit in order to effect heating of said heating unit at corresponding high and low heating rates; the combination comprising an electro-responsive motor mounted on the rear of said backsplasher and operative to operate said switch into a given one of its positions, an operating circuit for said motor, means responsive to manual operation of said switch into a predetermined one of its positions for preparing said operating circuit, means including a device governed by said heating unit for closing said prepared operating circuit, and means responsive to operation of said switch into said given one of its positions for opening said operating circuit.

6. In an electric range including a cooking top, a backsplasher, a heating unit carried by said cooking top, a source of current supply, a manually operable push button control switch mounted in an opening provided in said backsplasher and including off and high and low push buttons accessible from the front of said backsplasher, and means responsive to operation of said off push button for disconnecting said heating unit from said source and responsive to operation of said respective high and low push buttons for completing respective high and low electrical heating connections between said source and said heating unit in order to effect heating of said heating unit at corresponding high and low heating rates; the combination comprising an electro-responsive motor mounted on the rear of said backsplasher and operative to operate a given one of said push buttons, an operating circuit for said motor, means responsive to operation of a predetermined one of said push buttons for preparing said operating circuit, means including a device governed by said heating unit for closing said prepared operating circuit, and means responsive to operation of said given one of said push buttons for opening said operating circuit.

WALTER R. McDOWELL.

REFERENCES CITED

The following references are of record in the file of this patent:

UNITED STATES PATENTS

| Number | Name | Date |
|---|---|---|
| 2,025,302 | Olds | Dec. 24, 1935 |
| 2,036,049 | Ireland | Mar. 31, 1936 |
| 2,078,675 | Lockwood | Apr. 27, 1937 |
| 2,207,634 | Myers et al. | July 9, 1940 |
| 2,207,871 | Myers | July 16, 1940 |
| 2,222,124 | Sherman | Nov. 19, 1940 |
| 2,385,433 | Weber | Sept. 25, 1942 |
| 2,385,434 | Weber | Sept. 25, 1942 |
| 2,392,635 | Bletz | Jan. 8, 1946 |
| 2,399,423 | Bletz | Apr. 30, 1946 |
| 2,427,444 | Colombo | Sept. 16, 1947 |
| 2,431,904 | Andrews | Dec. 2, 1947 |
| 2,437,555 | Rees | Mar. 9, 1948 |
| 2,485,456 | Poole | Oct. 18, 1949 |

FOREIGN PATENTS

| Number | Country | Date |
|---|---|---|
| 7,882 | Great Britain | of 1910 |